US007320559B2

(12) United States Patent
Zupancic et al.

(10) Patent No.: US 7,320,559 B2
(45) Date of Patent: Jan. 22, 2008

(54) SYSTEM AND METHOD FOR DISPERSING OF COAL BED SODIC WATER

(75) Inventors: John W. Zupancic, Dodge City, KS (US); Jacob W. Roenbaugh, Haviland, KS (US); Glenn A. Mull, Pawnee Rock, KS (US); Charles M. Nicholson, Dodge City, KS (US)

(73) Assignee: BeneTerra, LLC, Pratt, KS (US)

( * ) Notice: Subject to any disclaimer, the term of this patent is extended or adjusted under 35 U.S.C. 154(b) by 218 days.

(21) Appl. No.: 11/181,516

(22) Filed: Jul. 14, 2005

(65) Prior Publication Data

US 2007/0012609 A1   Jan. 18, 2007

(51) Int. Cl.
*E02B 13/00* (2006.01)
(52) U.S. Cl. .............................. 405/43; 405/37; 405/51
(58) Field of Classification Search .................. 405/36, 405/37, 43, 44, 45, 51
See application file for complete search history.

(56) References Cited

U.S. PATENT DOCUMENTS

| 4,221,501 A | 9/1980 | Saburi |
| 4,986,905 A | 1/1991 | White |
| 5,017,906 A | 5/1991 | Pantus |
| 5,200,065 A | 4/1993 | Sinclair et al. |
| 6,802,956 B2 * | 10/2004 | Orlebeke .................... 205/701 |
| 6,824,224 B1 * | 11/2004 | Guadagno ...................... 299/2 |
| 6,929,753 B1 * | 8/2005 | Falcon ........................ 210/760 |
| 7,192,517 B2 * | 3/2007 | Webb .......................... 210/85 |
| 2003/0226766 A1 * | 12/2003 | Orlebeke .................... 205/688 |
| 2005/0109705 A1 * | 5/2005 | Webb ......................... 210/743 |
| 2005/0115906 A1 * | 6/2005 | Shay ........................... 210/665 |

\* cited by examiner

*Primary Examiner*—Frederick L. Lagman
(74) *Attorney, Agent, or Firm*—Lathrop & Gage LC

(57) ABSTRACT

A method for designing and implementing a system for subsurface drip irrigation dispersal of sodic water from a coal bed seam, the method comprising calculating a land surface area below which the sodic water dispersal system is to be placed, determining a concentration of total dissolved solids contained in the sodic water and in the aquifer ground water beneath the land surface area, developing a sodic water dispersal system configuration and dispersal sequence that limits the increase in the concentration of total dissolved solids in the aquifer ground water to no more than five hundred percent. Installing the sodic water dispersal system in the land area in accordance with the developed system configuration and pumping sodic water from the coal bed into the configured dispersal system in accordance with the developed dispersal sequence.

12 Claims, 5 Drawing Sheets

SYSTEM AND METHOD FOR DISPERSING OF COAL BED SODIC WATER

FIELD OF THE INVENTION

Extraction of coal bed methane involves pumping large volumes of water from coal bed seams in order to release water pressure that traps gas within the coal. The quantity, quality, and dispersal of this water is a source of much debate. Many coal bed seams are capable of producing 35 gallons of water per minute or 50,400 gallons of water per day for one well. The water produced along with the coal bed methane has a moderate salinity hazard and has a high sodium adsorption ratio, generally in excess of 12, which if surface irrigated can adversely impact soil structure, making plant growth difficult.

In some states existing coal bed methane operations are "grandfathered" and the product water is still being discharged directly into streams. Direct stream discharge is infrequently permitted on new wells because of the deleterious impact the discharge has on the stream's water quality. Coal bed product water is typically placed in a surface impoundment which involves constructing a pond in which coal bed methane product water is stored or allowed to infiltrate to the subsurface. There are several terms for these impoundments including: "holding ponds," "zero discharge ponds" or "infiltration ponds." Although they do not directly discharge water on the land surface, most impoundments are not lined and do discharge to the subsurface. Some percentage of seepage flow from impoundments is likely to reach stream channels via subsurface flow. Coal bed methane product water can also be land applied to crops or rangeland through traditional surface sprinkler irrigation equipment.

If the coal bed methane product water is properly delivered to the soil through subsurface drip irrigation this water dispersal process can alleviate the concern regarding seepage to streams of impounded product water, can improve crop yield by reducing the incidence of disease and weeds and can recharge shallow aquifers over time.

DESCRIPTION OF THE RELATED ART

U.S. Pat. No. 4,221,501 discloses a method and a system for underground irrigation which enables constant supplying of water in the amount required by cultivated plants to their root portions without waste of water. U.S. Pat. No. 4,986,905 discloses a self-contained residential and commercial treatment system which is capable of purifying waste water and then distributing the purified water by means of a sprinkler system or a drip feed irrigation system or of recycling the purified water in some manner. U.S. Pat. No. 5,017,040 discloses an improvement in a sewage disposal system and method of the type in which sewage is distributed to an effluent absorption area in the earth for dissipation to the earth that includes placing a layer of peat moss over the effluent absorption area to essentially cover the effluent absorption area and interposing a porous sheet, preferably of geotextile fabric, between the layer of peat moss and the effluent absorption area. U.S. Pat. No. 5,200,065 discloses a system for the discharge of a filtered effluent into a disposal area by, among other methods, a dripper field in which the effluent is emitted through multiple drip emitters in a plurality of pipes laid underground. The system also has the capability of back flushing the dripper field to maintain the emitters open and operating.

None of the above references seeks to resolve the problem of how to disperse the mounting inventories of coal bed product water in a manner that is economically feasible, complies with the constantly expanding set of environmental regulations imposed upon these inventories and can handle the dispersal of the product water no matter what climatic conditions may prevail.

The technology being used to produce coal bed methane requires pumping large volumes of water to the surface, where it is stored in impoundments that dominate the visual landscape in some parts of the country. This practice, which is designed to evaporate and infiltrate the water into the shallow aquifer, not only removes valuable land from production, but is a waste of valuable underground water reserves. Other methods of water dispersal have included "atomizing" the water into the air for evaporation; however, efficiency is low during cooler periods and evaporated condensate must be dealt with. Some efforts have been directed to evaporating over lined ponds so that the formation of ice mounds is not a problem.

Generally, prior art systems for dispersal of water containing undesirable by-products are directed to sewage disposal of single family dwellings, businesses and small industries and have not been directed to methods of disposing of large volumes of sodic water from coal bed methane seams and do not address concerns with minimizing deleterious impacts upon ground water.

SUMMARY OF THE INVENTION

In brief summary, this novel invention overcomes, or substantially alleviates, the prior art problems and provides a novel, economical, environmentally sensitive method for disposing of coal bed methane product water. Most coal bed methane product water is characterized as sodic water and is high in the sodium ($Na^+$) concentration relative to concentrations of calcium ($Ca^{2+}$) and magnesium ($Mg^{2+}$). Sodicity of water is expressed as the Sodium Adsorption Ratio (SAR):

$$SAR = Na/\sqrt{[(Ca+Mg)/2]} \text{ (These values are in meq/L)}$$

and the U.S. Department of Agriculture defines water with a SAR greater than 12 as sodic.

It is estimated that in calendar year 2004 natural gas from coal beds accounted for approximately 7% of total natural gas production in the United States and it is estimated that 13% of the land in the lower 48 United States has some coal under it, and some of this coal contains methane either in the form known as traditional natural gas or as coal bed methane.

Coal bed methane travels with ground water in coal seams and therefore extraction of coal bed methane involves pumping available water from the seam in order to reduce the water pressure that holds gas in the seam. Coal bed methane has very low solubility in water and readily separates as pressure decreases, allowing it to be piped out of the well separately from the water. Water moving from the coal seam to the well bore also encourages gas migration toward the well. It is common in many parts of the country to have between one and three wells every 80 acres depending upon the number of underlying coal seams from which the methane is being extracted. In calendar year 2003, oil and gas producers in the state of Wyoming alone produced 2.1 billion barrels of water from well operations. A large percentage of this water is attributable to coal bed methane production, is sodic, and was disposed of through the traditional potentially environmentally disadvantageous means employed by many mining and natural gas producing companies.

Direct discharge of water extracted from coal bed seams into a stream channel is rarely permitted on new wells and the product water is typically impounded on site. When the coal bed methane product water is impounded it involves constructing a large pond in which the water is stored or allowed to slowly infiltrate to the subsurface. Most impoundments are not lined and some percentage of seepage flow from impoundments is likely to reach stream channels. Most state environmental regulatory agencies require a permit before a source may discharge effluent to a water of the state without a permit and seepage flow is typically covered by this permitting requirement. Failure to comply with the state discharge regulations typically results in penalties and the owner or operator having to undertake corrective action, at significant cost, to rectify the leaking impoundment.

Another option for disposing of the coal bed methane product water is to use the water for surface irrigation of crops and range land grasses. Research has repeatedly documented the deleterious effects of sodicity on soil structure, particularly in soils dominated by fine textures and smectitic clays. Published U.S. Department of Agriculture—Natural Resources Conservation Service soil survey data and independent analyses of clay types have verified extensive alluvial soils in states with significant coal deposits have a predominance/preponderance of smectitic clay.

Sodic water has the opposite effect of saline water when surface applied to soil. The primary physical processes associated with high sodium concentrations are soil dispersion and clay platelet and aggregate swelling. The forces that bind clay particles together are disrupted when too many large sodium ions come between them. When this separation occurs, the clay particles expand, causing swelling and soil dispersion. Soil dispersion causes clay particles to plug soil pores, resulting in reduced soil permeability. When soil is repeatedly wetted and dried and clay dispersion occurs, it then reforms and solidifies into almost cement-like soil with little or no structure. The three main problems caused by sodium-induced dispersion are reduced infiltration, reduced soil permeability, and surface crusting which results in water runoff and ponding.

Soil permeability refers to the rate at which water flows through soil. For instance, soils with well-defined structure will contain a large number of macropores, cracks, and fissures which allow for relatively rapid flow of water through the soil. When sodium-induced soil dispersion causes loss of soil structure, the soil permeability is also reduced. If water cannot pass through the soil, then the upper layer can become swollen and water logged. This results in anaerobic soils which can reduce or prevent plant growth and decrease organic matter decomposition rates. The decrease in decomposition facilitates the formation of infertile, black alkali soils.

Disposing of the sodic water through subsurface drip irrigation involves the use of an irrigation system that uses drip tubes, also known as laterals, buried below the soil surface. A typical system layout consists of a holding area, typically a pond or tank, a pumping unit, a filtration unit equipped with back-flush control solenoid valves, pressure regulators, an air vent at a manifold, and laterals and emitters buried below grade to carry and disperse the water in the soil.

Subsurface application of water aimed directly at the root zone improves yields by reducing the incidence of disease and weeds. Subsurface drip irrigation is suitable for high-value fruit and vegetable crops, turf and landscapes. Moreover, farm operations become free of impediments that normally exist with above ground irrigation systems.

Subsurface application of water aimed directly at the root zone improves yields by reducing the incidence of disease and weeds. Germination of annual weed seed is reduced, which lowers weed pressure. Water is conserved, fertilizer efficiency is enhanced, and labor needs are reduced. In addition, field operations are possible, even when irrigation is applied. The applied water moves by soil matrix suction, eliminating the effect of surface infiltration characteristics and saturated condition of ponding water during irrigation. Application is uniform and highly efficient. Wetting occurs around the lateral and water moves out in all directions.

Subsurface drip irrigation of sodic water is flexible and can provide frequent light irrigations, heavy irrigations or any of a wide spectrum of options. Subsurface drip irrigation is suitable for almost all crops and can be used for high-value fruit and vegetable crops, turf and landscapes. A large variety of lateral configurations are available on the market. The polyethylene laterals have built-in emitters set at certain intervals along the lateral. Water drips out of the emitter opening at the end of a turbulent pathway, where the pressure is dissipated and water just dribbles out.

The spacing and the flow rate of the emitters are fine tuned according to the particular requirements of the installation. The laterals are available in variable wall thickness and the higher the MIL number, the thicker the wall, which extends the life of the lateral. The cost also goes up with the increase in wall thickness. The polyethylene laterals are optionally fitted with pressure-compensating emitters to make them suitable for distributing water uniformly in sloping fields. Pressure differential due to ground slope is avoided with these types of emitters. The methodology for determining the overall configuration of the dispersal system including the dispersal sequence and the depth of placement of the laterals is discussed in greater detail below.

The delivery system is composed of a main, sub-main and manifold, to which the laterals are attached. Optional items like a flow meter and a pressure gauge are essential to monitor the performance of the system. It is essential to provide an air release/vacuum breaker valve at the manifold for easy drainage of the laterals when the pump is shut off. The placement of the air release/vacuum breaker valve is determined according to the topography of the area into which the sodic water is to be disposed. The air release valve should be placed at the highest point of elevation at the delivery pipes. This will allow release of trapped air. The vacuum breakers help prevent suction development due to the partial vacuum created as the water leaves the lateral. In a freshly installed system, the loose soil may settle around a collapsed lateral, making it difficult for the lateral to regain its shape in the absence of an air vent.

The laterals are pulled below the soil surface, using an attachment typically drawn by a bulldozer. The lateral placement depths vary from 10 to 60 inches, depending on the soil and crop. Shallow-rooted crops, like strawberries, may require placement at 10 inches below the surface, depending on soil type and climate: capillary water movement is limited in sandy soils therefore shallow placement is recommended. In fine textured soils, i.e., those having significant fractions of clay and silt, water moves upward easier and can reach higher levels thus laterals can be placed deeper. The emitters on the lateral should face upward at installation.

It is an object of the invention to resolve the long felt need of disposing of the mounting inventories of coal bed sodic water in a manner that is economically feasible, complies with the constantly expanding set of environmental regulations imposed upon these inventories and can handle the dispersal of the product water no matter the temperature extremes that may be encountered.

Other objects, advantages and capabilities of the invention will become apparent from the following description taken in conjunction with the accompanying drawings, showing only a preferred embodiment of the invention.

DETAILED DESCRIPTION OF THE INVENTION

Figure 1:
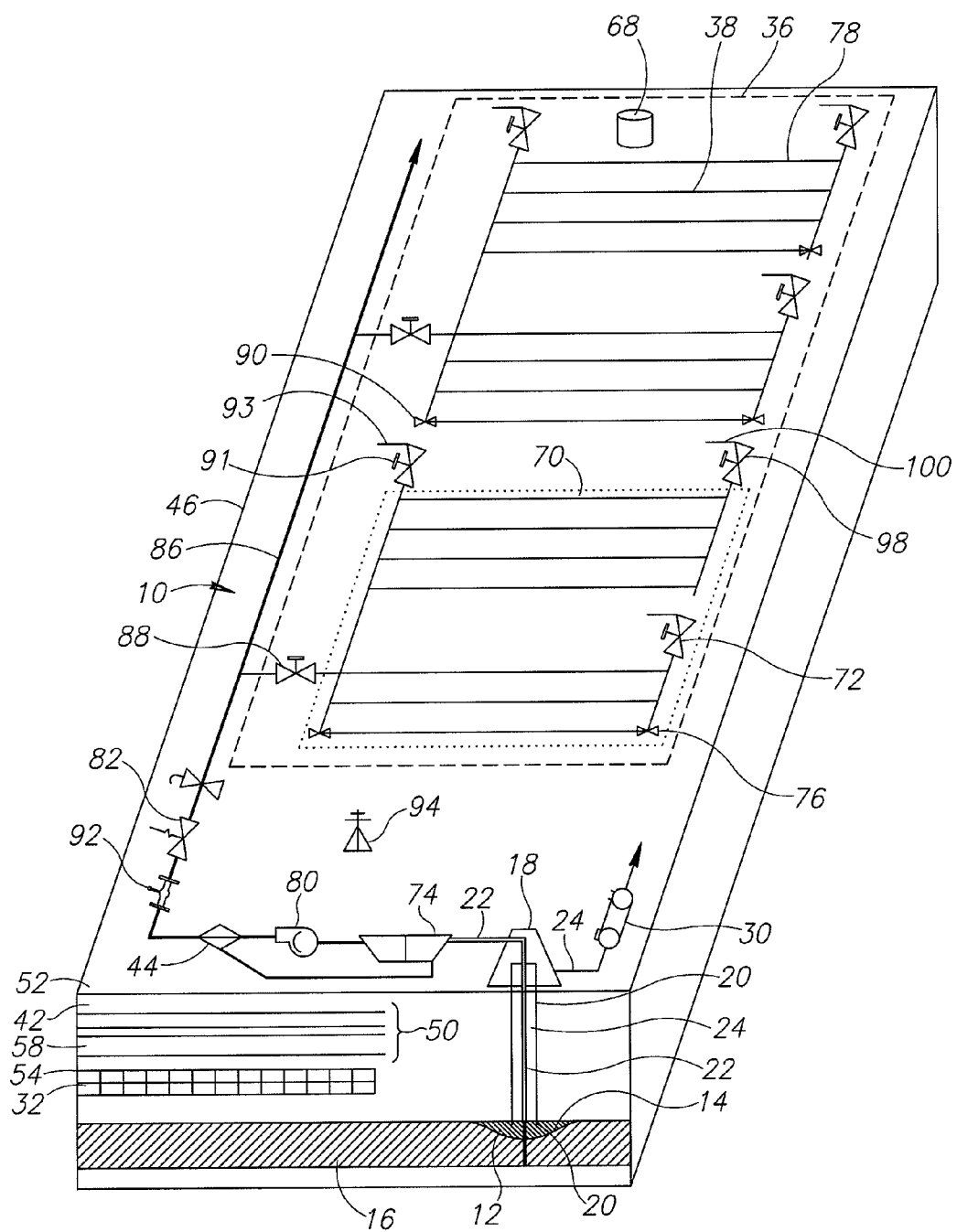
FIG. 1 is a schematic diagram of the elements of a system for dispersing sodic water from a coal bed of the present invention.

FIG. 1 depicts a sodic water dispersal system 10 and the various components to implement the system 10. The extraction of coal bed methane 12 involves pumping sodic water 14 from the seam 16 in order to reduce the water pressure that holds natural gas 12 in the seam. Coal bed methane 12 has very low solubility in water and readily separates as pressure decreases, allowing it to be piped out of the well 18 separately from the water 14. FIG. 1 depicts a typical coal bed well bore 20 and reveals that water moving from the coal seam 16 to the well bore 20 encourages gas migration toward the well bore 20.

Coal bed methane producers dewater the coal seam 16 to decrease the water pressure (or head of water) in the coal seam 16. As shown in FIG. 1, water 14 and methane 12 are extracted from the well through separate lines for water 22 and for gas 24. The methane is piped under pressure to a pumping station 30 which then moves the gas along a pipeline to a point of distribution.

The coal bed water is classified as sodic water 14 and sodic water is characterized as being high in the sodium ($Na^+$) concentration relative to concentrations of calcium ($Ca^{2+}$) and magnesium ($Mg^{2+}$). Sodicity of water is expressed as the Sodium Adsorption Ratio (SAR): $SAR=Na_{\sqrt{}}[(Ca+Mg)/2]$ (These values are in meq/L) and the U.S. Department of Agriculture defines water with a SAR greater than 12 as sodic.

If sodic water 14 is applied through traditional above ground sprinkler irrigation elevated sodium concentrations in the water can harm many woody plants due to direct toxicity as ions are applied directly to the leaves. Ions can accumulate in the leaves causing burn along the outer leaf edges. In addition, sodium can indirectly affect crop growth by causing calcium, potassium, and magnesium deficiencies or by adversely affecting soil physical properties. In addition to being a salinity component of irrigation water, sodium poses a more troublesome problem in soils containing more than 30% of a swelling type clay. On such soils, sodium changes soil physical properties, leading to poor drainage and crusting, which can affect crop growth and yield. When the sodic water is applied to the soil through subsurface drip irrigation the problems associated with flood and sprinkler irrigation are circumvented.

Methodology for System Configuration and Implementation

Figure 2:
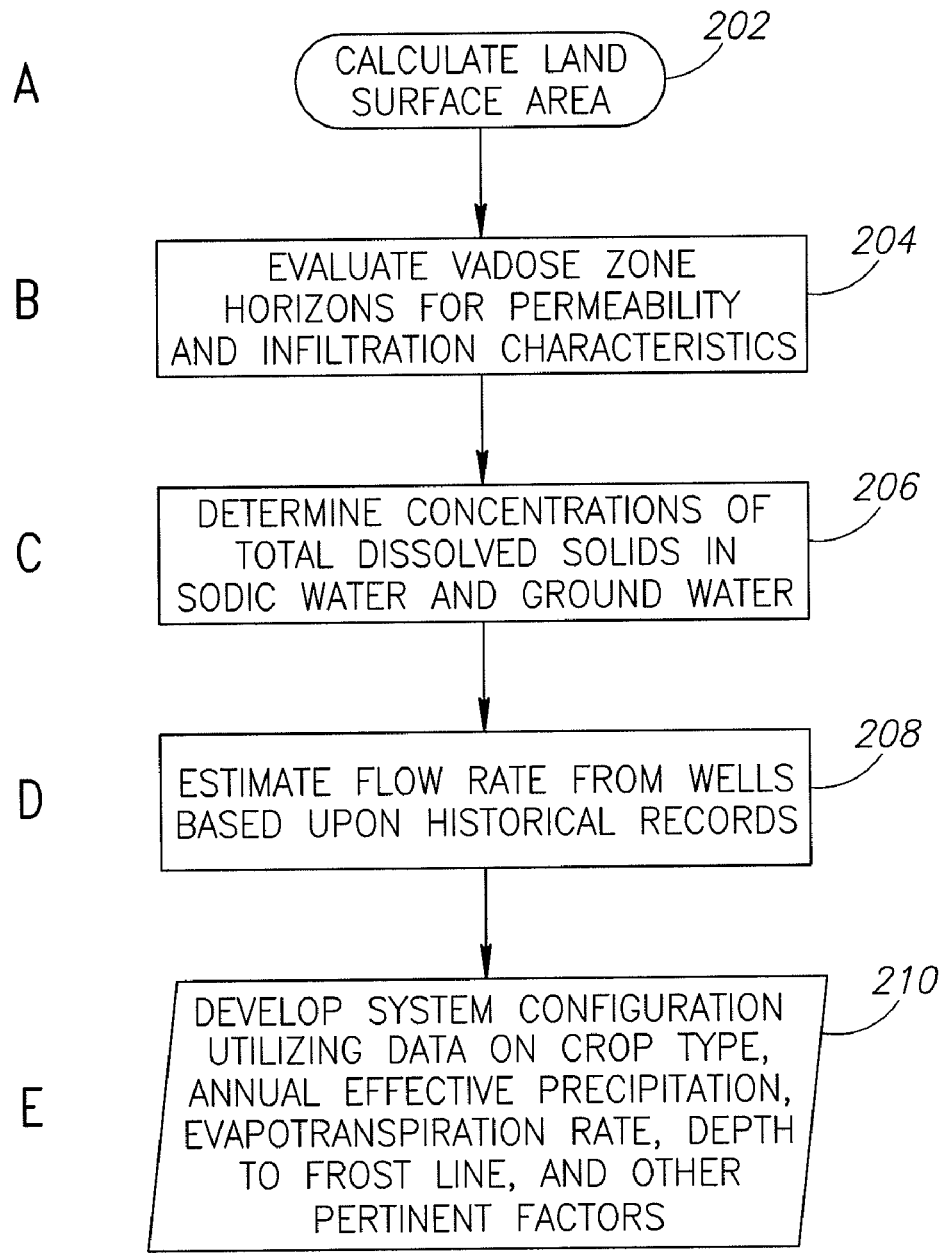
FIG. 2 is a flow diagram of the steps of a method for designing and implementing a system for subsurface drip irrigation dispersal of sodic water from a coal bed seam.

As seen in FIG. 2, the method for designing and implementing a system for subsurface drip irrigation dispersal of sodic water from a coal bed seam requires the collection and assessment information on numerous parameters that ultimately results in a dispersal system configuration and a dispersal sequence that yields an optimal subsurface sodic water 14 dispersal system 10. Moreover, the implemented system 10 frequently results in increased yield for rangeland grasses and crops without deleterious impact upon the ground water 32 beneath the installed system.

The capacity of the system 10 to disperse sodic water 14 is based primarily upon the land area 36 covered by the dispersal system 10, the sizing and spacing of the dispersal system components, i.e., the laterals 38 and emitters 40, as well as upon the ability of the soil 42 and groundwater (also known as the aquifer) 32 to absorb the sodic water. The sodic water production rate of wells can many times be estimated by referring to production data from wells in similar formations and estimating the daily flow over the life of the well.

As shown in the flow chart of FIG. 2, Step A requires that the land area 36 to be covered by the dispersal system 10 be preferably calculated with the assistance of a global positioning system ("GPS") device that is mounted to the dash of a full size vehicle or to an all terrain vehicle ("ATV"). The vehicle travels the boundaries within which the subsurface drip irrigation system will be located. Traversing the property boundary allows the GPS device to record the location of the vehicle with a high level of precision. The data from the GPS device is then transferred to a standard desktop/laptop computer and utilizing software such as Global Mapper, ARC-GIS or ARC VIEW the property boundary 46 can be plotted on a topographic map and the total land area 36 within the boundaries calculated 48.

Alternatively, manual measurements can be taken using traditional survey equipment. Survey measurement techniques provide highly reliable data but in cases where large tracts of level land are being considered for subsurface irrigation, these techniques may be more time consuming and produce data that is not as readily compatible with sophisticated GIS software.

The vadose zone 50, as depicted in FIG. 1, also termed the unsaturated zone, is the portion of Earth between the land surface 52 and the water table 54, and is thus not considered groundwater 32. The vadose zone 50 comprises the unsaturated portion of the soil, regolith or bedrock, as well as the saturated capillary fringe above the water table 54. The pore spaces in the vadose zone 50 are subject to atmospheric pressure, and so the water is held to the regolith and rock by adhesion, and in pore spaces by capillary action. The vadose zone 50 is an intrinsic part of the hydrologic cycle, essentially controlling interrelationships between precipitation, infiltration, surface runoff, evapotranspiration and groundwater recharge. The vadose zone regulates the transfer of water from the land surface to groundwater and vice versa 56, while providing protection, screening, filtering, transfer and attenuation of potential groundwater contaminants that are delivered via the land surface. The sodium adsorption ratio of the dispersed water may change as it passes through the vadose zone 50 dissolving latent minerals.

The characteristics of the vadose zone horizons 58, through which the sodic water must pass before reaching the groundwater 32, also known as the aquifer, must be well understood to assess each horizon's 58 impact upon the dispersal system 10 configuration and the dispersal sequence 62. The Natural Resource Conservation Service Soil Survey provides qualitative ratings for the permeability of horizons 58 by ranking them as slightly permeable through highly permeable. A highly permeable horizon, such as with sandy soils, may have a high infiltration rate wherein water flows rapidly through the permeable horizon.

Conversely, a slightly permeable horizon, such as with high clay content soils, likely has a very low infiltration rate that substantially restricts the passage of water through the horizon. The permeability and infiltration characteristics of each horizon coupled with the thickness of the horizon must be evaluated in light of the volume of water to be dispersed as well as the sodium adsorption ratio of the water being dispersed. Evaluating the impact of the sodium adsorption ratio on the overall system configuration is important because the adsorption ratio will change as the water moves through the vadose because the water will dissolve calcium and magnesium with the net effect that the adsorption ratio will be lower.

Determining the classification of the vadose zone horizons 58 and the depth and expanse of the aquifer 60 is undertaken by employing a boring rig to yield a cylindrical sample of soil down to bedrock. If properly analyzed, borings reaching to the bottom of the aquifer 32 can be used to produce a ground water map 64 as shown in FIG. 4, and a vadose zone horizon map 66 as seen in FIG. 6, that yield considerable insights into permeability and infiltration rates as well as rate and direction of ground water movement. The vadose zone horizons 58 as seen FIG. 6 are, for example, characterized as top soil or loamy 58A, clayey 58B, silty clay 58C, fine sand 58D, coarse sand 58E, gravel 58F and mixed gravel and rock in the aquifer 58G. When the vadose zone boring horizons (A through D) are positioned adjacent one another as seen in FIG. 6, it is possible to see the depths to which the various horizons (58A-58G) reach thereby providing an indication of permeability and infiltration rate.

Step B, as seen in FIG. 2, requires the assessment of the vadose zone horizons to determine their permeability and infiltration rates and Step B provides for development of a ground water map 64 that can be further utilized in determining the configuration of the dispersal system 10 and the dispersal sequence. The ground water map 64 is especially critical if the dispersal system 10 is to be located in proximity to an alluvial system. In those situations it is critical to know the depth and location of the aquifer 32 to fully evaluate the impact that the sodic water dispersal system may have upon the alluvial system. As seen in FIG. 2, Step C provides that once the groundwater has cleared from the disturbance caused by the boring rig a monitoring well or piezometer may be installed to obtain samples to determine the concentration of total dissolved solids. Commensurately, the concentration of the total dissolved solids in the sodic water can be determined once the water is passed through the system 10 filter 44. The sodic water sample is then also provided to the same analytical laboratory that receives the groundwater sample. The concentration of total dissolved solids is generally considered a surrogate for other contaminants and is readily determined according to the testing protocol found at Standard Methods for Water Analysis No. 2540C, 20th Edition.

To evaluate the impact that the sodic water dispersal system may have upon groundwater quality there are several factors that are generally examined. As seen in FIG. 2, Step D requires that the anticipated rate of sodic water flow from the coal seam 16 is determined by reviewing historical flow rates for wells in similar formations. As the well increases in age, the volume of sodic water production typically declines in a predictable fashion which can be used to assist in estimating flow rate. Large volumes of sodic water 14 dispersed into ground water 32 could have an adverse impact upon the ground water 32 depending upon the concentration of total dissolved solids, the sodium adsorption ratio and primarily the rate at which the sodic water is charged into the dispersal system. Consequently, the flow rate and dispersal sequence 62 of the sodic water into the subsurface drip irrigation system may need to be controlled to a specified level in order to avoid overburdening the aquifer with dissolved solids or altering other groundwater characteristics.

Because approximately 80 percent of community water systems depend, at least in part, on ground water 32 in providing drinking water, federal law mandates that the states develop underground injection control programs. Many households rely on ground water for their private drinking water wells and injection of fluids could possibly cause contamination of aquifers that supply drinking water to the public water systems and private wells. If monitoring of ground water parameters, such as total dissolved solids, is required pursuant to a state or federal underground injection control permit, the point of compliance with the terms and conditions of that permit will typically be one or more monitoring wells 68 located in proximity to the dispersal system 10. An underground injection control permit will typically place a not to exceed limit on the concentration of total dissolved solids found in the ground water 32 at the monitoring well 68.

Developing configuration and operating parameters for the subsurface drip irrigation system 10 requires developing a dispersal system configuration and a dispersal sequence. The dispersal system configuration requires determining the size, location and depth of laterals 38 as well as the size, location and number of emitters 40 attached to the laterals 38. Establishing a dispersal sequence requires orchestrating the optimal operating sequence and duration of the charging of each zone 70 within the dispersal system 10.

Step E, as seen in FIG. 2, comprises determining the depth of placement of the laterals 38. There are several factors that are preferably included in the analysis for lateral depth. Deep rooting vegetation and crops allow a deeper placement of the dispersal system because of the ability of the roots to reach the water being dispersed. A certain crop grown in a sunny and hot climate needs more water per day than the same crop grown in a cloudy and cooler climate. There are, however, apart from sunshine and temperature, other climatic factors which influence the crop water need. These factors are humidity and wind speed. When it is dry, the crop water needs are higher than when it is humid. In windy climates, the crops will use more water than in calm climates. The influence of the crop type on the crop water need is important in two ways.

First, the crop type has an influence on the daily or seasonal consumptive use of a fully grown crop; i.e. the peak daily water needs of a fully developed maize crop will need more water per day than a fully developed crop of onions. The crop type has an influence on the duration of the total growing season of the crop. There are short duration crops, e.g. peas, with a duration of the total growing season of 90-100 days and longer duration crops, e.g. melons, with a duration of the total growing season of 120-160 days. There are, of course, also perennial crops that are in the field for many years, such as fruit trees. While, for example, the daily water need of melons may be less than the daily water need of beans, the seasonal water need of melons will be higher than that of beans because the duration of the total growing season of melons is much longer. Data on the duration of the total growing season of the various crops grown in an area can be obtained locally. These data may be obtained from, for example, the local seed supplier or Agricultural Extension Service.

Second, it is important to factor into the overall analysis the normal annual effective precipitation. If the location of the sodic water dispersal system is to be located in an area with considerable annual precipitation this will suggest that the dispersal system laterals be placed lower in the soil because the resident crops and vegetation will be more reliant upon precipitation than on water provided by the dispersal system. The annual effective precipitation can be obtained from the National Weather Service or alternatively from a private service that maintains a database with this information.

Third, a factor that is appropriately considered in the assessment for determining depth of lateral placement is the evapotranspiration for the resident vegetation 160. If the resident vegetation, whether rangeland grasses or commodity crops, has a high evapotranspiration rate then the need for water for the vegetation or crop is greater than for plants with low evapotranspiration rates. Consequently, dispersal systems in locations with crops possessing a high evapotranspiration rate would preferably be placed higher in the soil than those with a low evapotranspiration rate so that the roots of the high evapotranspiration vegetation are in proximity to the dispersal system water. Information on a crop's evapotranspiration rate can also be obtained from the U.S. Department of Agriculture, State Cooperative Extension Services, the U.S. Bureau of Reclamation, FAO Irrigation and Drainage Paper 56 or authoritative textbooks on crops.

Finally, the depth of the frost line in the area where the dispersal system is to be installed can be obtained from local heavy equipment operators who regularly view the depth of the frost line when their equipment is moving soil and exposing the depth to which the frost line extends. The frost line information is critically important because laterals 38 and emitters 40 placed above the frost line are potentially subject to freezing temperatures. The freezing temperatures can not only stem the flow of water through the laterals 38 to the emitters 40 because of ice blockage, but in extreme situations the freezing temperatures can cause damage to the dispersal system 10 components, such as cracking of the main or sub-mains, that may require costly repairs. Consequently, it is generally preferable that the dispersal system components be placed below the frost line. Alternatively, for those dispersal systems placed above the frost line it is important for the system operator to either purge the system of standing water or to maintain a constant flow of sodic water through the laterals and emitters thereby denying the water an opportunity to freeze in place.

The depth of placement of the laterals is but one of a plurality of inputs to the development of the overall dispersal system configuration. In addition to the depth below grade of the dispersal system 10 there are the issues of spacing between laterals 38, spacing between the emitters 40, the size of the laterals 38 and the size of the emitters 40. The appropriate size and spacing of the emitters 40 and laterals 38 is primarily determined by examining the expected extent of lateral movement of the sodic water 14 being dispersed. If the soil horizons are highly transmissive, such as with sandy soils, then there is little lateral movement of the water. Consequently, the higher the permeability of the soil then the closer together the laterals 38 and emitters 40 will be placed.

It has been determined that laterals 38 are appropriately separated by as little as 12 inches up to as much as 300 inches depending upon the permeability of the soil. Similarly, it has been determined that the emitters 40 are appropriately separated by as little as 6 inches and as much as 60 inches, again depending upon the soil permeability. To a lesser extent the contour of the land surface under which the dispersal system is being placed will influence the spacing of the laterals 38 and the emitters 40 as will the climatic conditions, growing season, depth to aquifer, vegetation and other parameters. Installing emitters 40 that are too large may result in the collection of excess water collected in surface areas.

The system and method presented herein seeks to utilize, to the maximum extent possible, the dispersal system 10 filter 44 as seen in FIG. 1, to reduce the concentration of total dissolved solids, and other contaminants prior to entry of the sodic water 14 into the system 10 and ultimately the soil 42. It is the objective of this invention to implement a sodic water 14 dispersal system 10 that limits the total dissolved solids to no more than a five fold (500%) increase at a down gradient monitoring well that is located on, or proximate to, the land area 36 as seen in FIG. 1. As applied to analytical testing of sodic water 14, total dissolved solids are generally considered a surrogate for salinity. Consequently, maintaining total dissolved solids, and hence salinity, to within initial classification is the goal of this system and method.

Another parameter that is critical to the success of the dispersal system 10 is the development of a dispersal sequence 62. Typically, a dispersal system 10 is configured into one or more zones 70. The charging with sodic water 14 of each zone 70 is performed by an electronically controlled pressure regulating valve 88. If the valve 88 is controlled electronically it will preferably be linked to a supervisory control and data acquisition system ("SCADA") 94 wherein the valves are opened and closed based upon specific time parameters or possibly utilizing soil moisture content as determined by transducers located in the soil 42 at strategic locations within the zone 70. The land area is preferably divided into zones 70 ranging from 8 to 14 acres; however, zones as large as 20 acres, or more, may be appropriate in certain situations.

The sequencing of the operation of the zones is determined primarily by examining the soil permeability classifications. If the soil 42 in a zone 70 has low permeability and therefore the movement of the sodic water downward toward the aquifer 32 takes an extended period of time then once the soil proximate the surface 52 nears a desired level of water content, determined either through visual determination, predictive methodologies or by soil moisture measurements, the valve 88 controlling the flow of sodic water to that zone 70 is closed. A visual indicator that the soil 42 is approaching saturation or is overly saturated is a phenomenon known as "surfacing." When the laterals 38 are placed into the soil 42 by slicing through the soil with a plow, the disturbance of the soil 42 causes the water released by the dispersal system 10 to follow the plow slit to the surface 52. Once excessive water has surfaced this can result in the same deleterious effects to the surface soil as traditional surface irrigation techniques including soil dispersion and clay platelet and aggregate swelling. Consequently, the sequencing of dispersal system zones 70 facilitates drainage of the soil 42 thereby causing fewer adverse impacts to the soil.

System Components

FIG. 1 illustrates a preferred layout for a system 10 for dispersing of coal bed sodic water 14 through subsurface drip irrigation. The line feed 22 from the coal seam 16 empties into a holding area 74. The holding area 74 allows sodic water 14 to off-gas volatiles that may be entrained within the water 14. An alternative embodiment of the system 10 may employ a second holding area to facilitate further settling of solids from the area 74 before the sodic water 14 is pumped into the buried laterals 38. For those situations where the utilization of a holding area 74 may not be possible, such as when ambient temperatures are considerably below 32° F., the sodic water may need to be pumped directly to the laterals 38 without any time spent in the holding area 74. Elimination of holding time to facilitate off-gassing of volatiles increases the need for utilization of continuous acting air relief valves 76 on the flush manifolds 72 of the lateral network 78. These air relief valves 76 allow gases to be purged from the lateral network 78 to avoid gas blockages that can disrupt proper operation.

Once the sodic water 14 has been sufficiently off-gassed and an appropriate amount of time has passed for settling of suspended solids, a pump 80 is employed to move the water into the lateral network 78. The pump 80 is preferably sized to accommodate delivery of at least 5 ft/acre-year of sodic water 14 to the soil 42 and is preferably a submersible variable frequency drive pump such as the Auaqvar® system manufactured by Goulds Pumps of Auburn, N.Y. It will be appreciated by those skilled in the relevant art that the sizing of the pump 80 is based upon the volume of water to be dispersed, the surface gradient encountered and potentially other factors. Larger pump sizes may be desirable in certain settings if delivery of more significant volumes of sodic water 14 is anticipated or if the soil conditions are exceptionally arid and capable of absorbing larger amounts of water.

Figure 3:
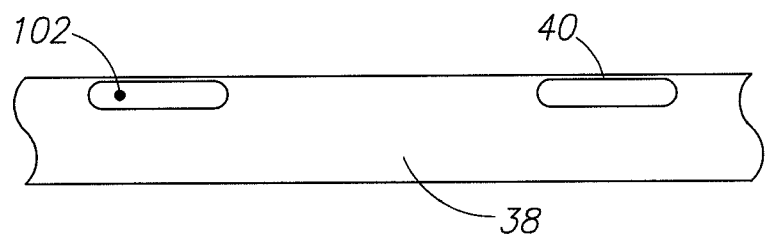
FIG. 3 is a side elevation view of a lateral with optional pressure compensating emitters.
Figure 4:
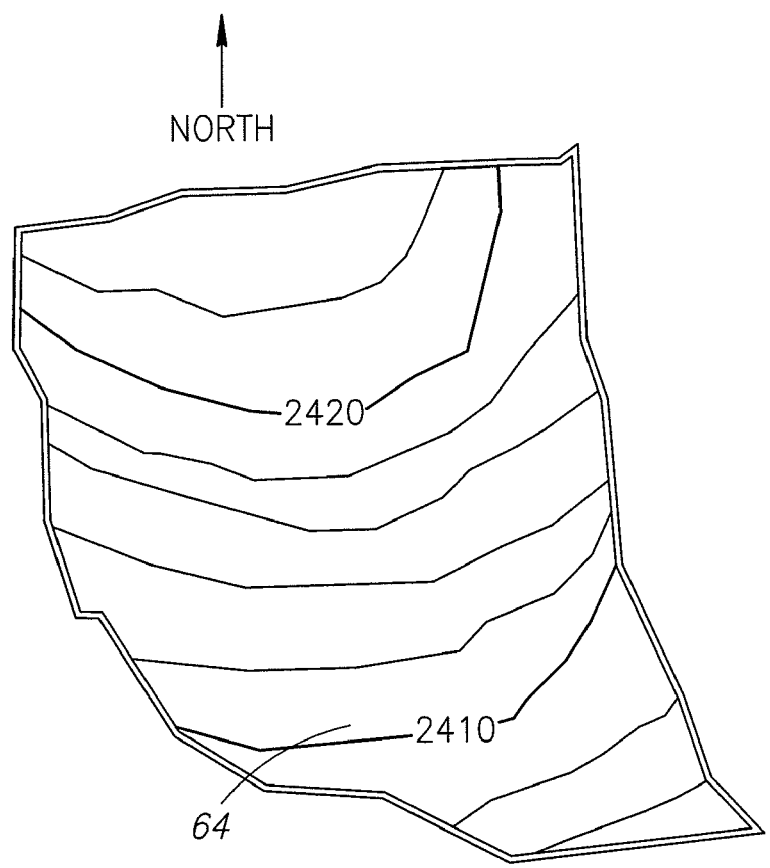
FIG. 4 is a depiction of a ground water contour map to assist in estimating the direction and flow of groundwater in proximity to a dispersal system of the present invention.
Figure 5:
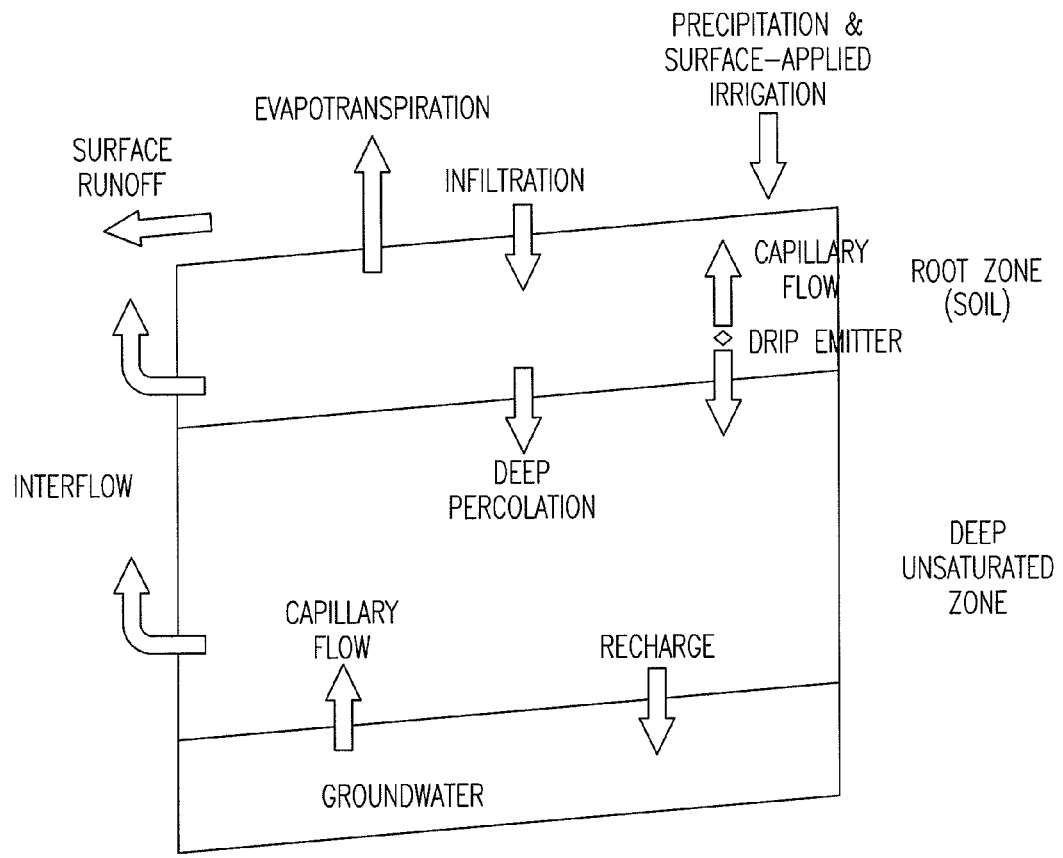
FIG. 5 is a side elevation view of a diagram depicting the water fluxes associated or controlled by the vadose zone.
Figure 6:
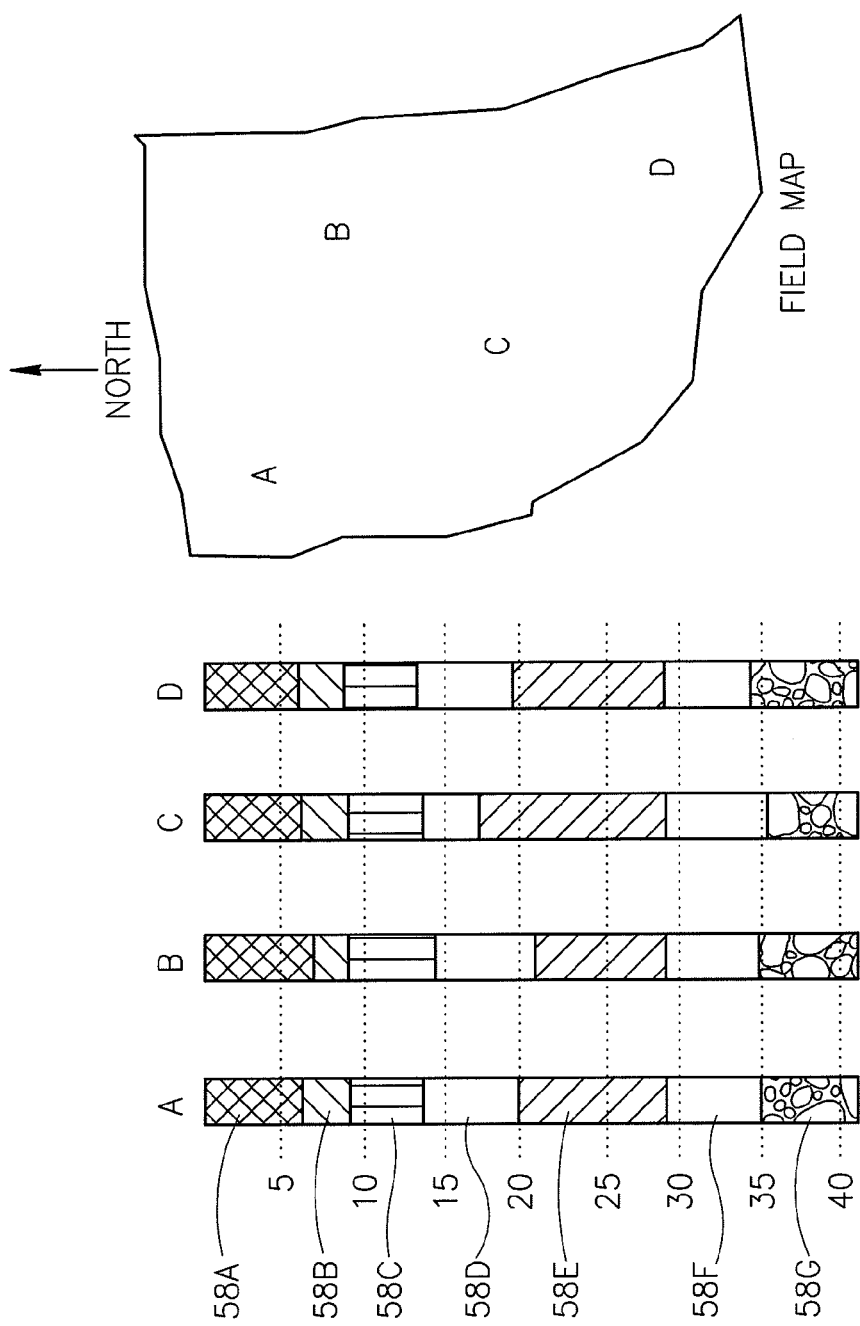
FIG. 6 is vadose zone horizon map as utilized in estimating the permeability and infiltration classification of each of the horizons from soil borings.

The pump 80 moves the sodic water 14 through a filter 44 with mesh openings preferably no greater than one hundred twenty microns to remove any solids that had not settled in the holding area 74. A one hundred twenty micron mesh size filter 44 is preferred in order to minimize the potential for clogging of the emitters 40, as seen in FIG. 3, with solids. The filter 44 should be appropriately sized for overall filter surface area taking into account the average level of total suspended solids that are anticipated to exist in the sodic water supply over the duration of the system 10 operation. It is recommended that a maintenance interval be established for either back flushing of the system 10 to purge the filter 44 or that the filter be replaced periodically. A preferred filter for a system of this configuration is manufactured by Arkal Filtration Systems of Jordan Valley, Israel.

After the sodic water 14 passes through the filter 44 it moves into a main line 86 that is buried beneath the surface grade at a depth of at least 12 inches and preferably at least 18 inches. The system 10 preferably employs electronically controlled pressure regulating valves 88 between the main 86 and the header manifolds 90 for each zone 70. These regulating valves 88 reduce the pressure of the sodic water 14 to a level that will not damage the emitters 40 or any other portion of the underground lateral network 78 and yet provide sufficient water pressure to allow the emitters 40 to optimally function. A separate pressure regulating valve 88 is utilized in each zone 70 to control the dispersal of water within the zone. Each manifold 90 preferably incorporates a manual flush valve 91 and riser 93. The manual flush valve and riser are utilized for increased flow of water through the manifold to purge the line of sediment. With the passage of time a manifold line can become clogged with sediment if it is not periodically purged with a charge of fresh water. The flush values 91 are opened to increase the flow rate through the desired zone 70. The increased flow rate causes scouring of the pipe walls and removes debris that has settled or attached to pipe walls.

It will be appreciated by those skilled in the art that the sizing of the main 86 and manifold 90 lines is dependent upon the volume of water per unit of time to be delivered to the lateral network. PVC pressure pipe supplied by Silver Line® of Asheville, N.C. is exemplary of pipe preferred for the main lines 86; however, other PVC pipe is also acceptable.

It is also preferred to have a flow meter 92 and a pressure regulator 82 as elements of the overall system 10. The flow meter 92 is utilized to confirm the flow rate of the sodic water 14 into the laterals 38 and a pressure regulator 82 is utilized to establish a desired water pressure within the mains 86 of the system 10 prior to passage through the electronically controlled pressure regulating valves 88 and into the manifold lines 90.

Depending upon the land area 36 covered by the sodic water dispersal system 10 there may be numerous zones 70 and consequently numerous manifolds 90 for delivering the sodic water 14 to the buried laterals 38. It will be appreciated by those skilled in the art that a large variety of lateral sizes are available and the appropriate sizing of the laterals 38 is primarily determined by the rate at which sodic water 14 is to be delivered to the laterals. Polyethylene laterals 38 can be purchased with emitters 40 at varying intervals, such as 6 inch or 12 inch separations. The polyethylene laterals 38 are preferably fitted with pressure-compensating emitters 40, as seen in FIG. 3, and are suitable to distribute sodic water 14 uniformly in sloping fields because the pressure differential arising from ground slope is mitigated. The pressure compensating emitters provide a uniform output within the desired pressure ranges from 5 to 35 psi.

The laterals 38 are buried at least 10 inches deep and could potentially be buried at 60 inches depending upon the factors such as crop type, annual effective precipitation, evapotranspiration rate and depth to the frost line as previously discussed. It will be appreciated by those skilled in the art that placement of the laterals 38 at a depth below the frost line will reduce the potential for freezing of the water within the system, however, it is optional to place the system components at a depth that is well above the frost line and overcome the potential for plugging of the mains 86 by continuously running sodic water 14 through the system 10 thereby denying the water the opportunity to freeze.

As seen in FIG. 1, and as discussed above, the laterals 38 are preferably placed in a configuration with the emitters spaced from 6 to 60 inches apart. The laterals themselves are preferably spaced a distance of from 12 to 300 inches apart. The sodic water 14 escaping from the emitters 40 moves by soil matrix suction and gravitational flow, eliminating the effect of surface infiltration characteristics and saturated condition of ponding water caused by sprinkler irrigation. The application of the sodic water 14 through the buried laterals 38 is uniform and highly efficient. Wetting occurs around the emitters 40 and water moves out in all directions. As seen in FIG. 1, the dispersal system 10 will preferably employ flush manifolds 72 at the ends of the laterals 38 of each zone 70 to allow the laterals in each zone to be purged of sediment that can plug the emitters 40. As seen in FIG. 1, each flush manifold 72 of each zone 70 preferably incorporates a manual flush valve 98 and riser 100.

Periodically, an increased flow rate of water is fed into the manual flush valve 98 to loosen any sediment that has built up in the laterals 38 and emitters 40. The fresh water serves to dislodge the sediment that has accumulated over time and that can plug the outlet 102 from the emitters 40.

The sodic water dispersal system 10 will preferably employ a supervisory control and data acquisition ("SCADA") system 94 that controls the operation of the electronically controlled pressure regulating valves 88. It will be appreciated by those skilled in SCADA systems that such a system will employ either pre-set time limits for dispersal of sodic water in each zone 70 or may, for example, utilize sensors for detecting soil moisture. If duration controlled, the SCADA system 94 will signal the regulating valves 88 to open and close at predetermined times. If sensor controlled, the SCADA system 94 will continuously monitor the readings from the transducers placed within the zone 70 to determine if a pre-set value has been reached. If the pre-set moisture level is achieved then the SCADA system 94 will cause the electronically controlled valves 88 to close.

The present system 10 is especially useful in agricultural settings. The system 10 can be operated year round and is flexible enough to be adapted to different loads, soil conditions and vegetation. The present system is affordable and adaptable to a wide range of soil conditions not normally amenable to surface irrigation.

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

What is claimed is:

1. A method for subsurface drip irrigation dispersal of sodic water from a coal bed seam, the method comprising:
    calculating a land surface area below which the sodic water dispersal system is to be placed;
    determining a concentration of total dissolved solids contained in the sodic water;
    determining a concentration of total dissolved solids in the aquifer proximate the land surface area;
    developing a sodic water dispersal system configuration and dispersal sequence that limits the increase in the concentration of total dissolved solids in the aquifer to no more than five hundred percent;
    installing the sodic water dispersal system in the land area in accordance with the developed system configuration; and
    pumping sodic water from the coal bed seam into the configured dispersal system in accordance with the developed dispersal sequence.

2. The method as in claim 1, wherein the step of developing a sodic water dispersal system configuration and dispersal sequence that limits the increase in the concentration of total dissolved solids in the aquifer ground water to no more than five hundred percent further comprises estimating the infiltration rate and permeability characteristics for each vadose zone horizon to determine the impact upon recharge of the aquifer ground water by the sodic water.

3. The method as in claim 1, wherein the step of developing a sodic water dispersal system configuration and dispersal sequence that limits the increase in the concentration of the total dissolved solids in the aquifer ground water to no more than five hundred percent further comprises segregating the system into one or more zones wherein each zone may be individually operated for sodic water dispersal.

4. The method as in claim 1, wherein the step of developing a sodic water dispersal system configuration and dispersal sequence that limits the increase in the concentration of the total dissolved solids in the aquifer ground water to no more than five hundred percent further comprises determining the type of vegetation disposed upon the land area.

5. The method as in claim 1, wherein the step of developing a sodic water dispersal system configuration and dispersal sequence that limits the increase in the concentration of the total dissolved solids in the aquifer ground water to no more than five hundred percent further comprises determining the impact of the annual effective precipitation rate upon land area water needs.

6. The method as in claim 1, wherein the step of developing a sodic water dispersal system configuration and dispersal sequence that limits the increase in the concentration of the total dissolved solids in the aquifer ground water to no more than five hundred percent further comprises determining the depth to the frost line.

7. The method as in claim 1, wherein the system configuration is the location and spacing of a plurality of laterals and emitters attached to the laterals.

8. The method as in claim 1, wherein the sodic water dispersal sequence is the sequencing of the delivery of the sodic water to the plurality of laterals and emitters attached thereto.

9. A method for subsurface drip irrigation dispersal of sodic water from a coal bed seam, the method comprising:
    estimating the volume of sodic water requiring dispersal;
    calculating the land area for dispersal of the sodic water;
    evaluating the climatic conditions and vegetation options of the land area;
    analyzing the concentration of the total dissolved solids in the sodic water and in the aquifer ground water;
    estimating the infiltration rate and permeability characteristics of each horizon of the vadose zone,
    correlating the sodic water volume, land area, climatic conditions, vegetation options, concentrations of total dissolved solids, infiltration and permeability rates to determine a system configuration and flow sequence that limits the increase in the concentration of total dissolved solids in the aquifer ground water to no more than five hundred percent.

10. The method as in claim 9, wherein the step of evaluating the climatic conditions and vegetation options of the land area comprises:
    determining the length of the growing season;
    determining the normal annual effective precipitation;
    determining the evapotranspiration for the resident vegetation; and
    determining the depth to the frost line in the soil.

11. The method as in claim 10, wherein the system configuration is the location and spacing of a plurality of laterals and emitters attached to the laterals.

12. The method as in claim 10, wherein the sodic water dispersal sequence is the sequencing of the delivery of the sodic water to the plurality of laterals and emitters attached thereto.

* * * * *